United States Patent [19]

Bitter

[11] Patent Number: 4,655,811
[45] Date of Patent: Apr. 7, 1987

[54] CONDUCTIVE COATING TREATMENT OF GLASS SHEET BENDING PROCESS

[75] Inventor: Lowell E. Bitter, Holland, Mich.

[73] Assignee: Donnelly Corporation, Holland, Mich.

[21] Appl. No.: 813,558

[22] Filed: Dec. 23, 1985

[51] Int. Cl.$^4$ .................. C23C 15/00; C03B 23/023
[52] U.S. Cl. ................................. 65/60.51; 65/60.6; 65/106; 65/107; 427/58; 427/109; 204/298; 204/192.15
[58] Field of Search .................. 65/60.51, 60.60, 106, 65/107; 427/109, 58; 204/192 R, 192 SP, 192 M, 192 C, 298

[56] References Cited

U.S. PATENT DOCUMENTS

| Re. 25,711 | 1/1965 | Gaiser | 156/101 |
|---|---|---|---|
| 1,077,357 | 11/1913 | Marino . | |
| 2,447,379 | 8/1948 | Wenger . | |
| 2,511,472 | 6/1950 | Kmecik . | |
| 2,628,927 | 2/1953 | Colbert et al. | 154/2.73 |
| 2,871,623 | 2/1959 | Marini | 65/107 U X |
| 2,927,042 | 3/1960 | Hall et al. . | |
| 2,954,454 | 9/1960 | Gaiser | 219/19 |
| 3,001,901 | 9/1961 | Barkley | 156/222 |
| 3,108,019 | 10/1963 | Davis . | |
| 3,260,584 | 7/1966 | Badger | 65/60.6 |
| 3,282,815 | 11/1966 | Kay et al. | 204/192 |
| 3,506,556 | 4/1970 | Gillery | 204/192 |
| 3,655,545 | 4/1972 | Gillery | 204/192 |
| 3,907,660 | 12/1975 | Gillery | 204/298 |
| 4,065,600 | 12/1977 | King | 428/432 |
| 4,094,763 | 6/1978 | Gillery et al. | 204/192 P |
| 4,102,722 | 7/1978 | Shoop | 156/99 |
| 4,102,768 | 7/1978 | Kearin et al. | 204/192 P |
| 4,109,044 | 8/1978 | Marriott | 428/210 |
| 4,113,599 | 9/1978 | Gillery | 204/192 P |
| 4,119,425 | 10/1978 | Marriott | 65/107 |
| 4,201,649 | 5/1980 | Gillery | 204/192 P |
| 4,202,917 | 5/1980 | Ishii et al. | 427/161 |
| 4,277,517 | 7/1981 | Smith, Jr. | 427/96 |
| 4,387,134 | 6/1983 | Kalbskopf et al. | 428/215 |
| 4,399,015 | 8/1983 | Endo | 204/192 P |
| 4,414,281 | 11/1983 | Hoda | 428/433 |
| 4,490,227 | 12/1984 | Bitter | 204/192 SP |
| 4,503,090 | 3/1985 | Brown et al. | 427/96 |

FOREIGN PATENT DOCUMENTS

| 555403 | 4/1958 | Canada . | |
|---|---|---|---|
| 566773 | 12/1958 | Canada . | |
| 733062 | 4/1966 | Canada | 65/60.51 |
| 0040076 | 11/1981 | European Pat. Off. . | |
| 2441862 | 6/1979 | Fed. Rep. of Germany . | |
| 2854213 | 7/1980 | Fed. Rep. of Germany . | |
| 53-118417 | 3/1977 | Japan . | |
| 739565 | 11/1955 | United Kingdom . | |
| 1446849 | 8/1976 | United Kingdom . | |
| 2094355 | 9/1982 | United Kingdom . | |
| 2116590 | 9/1983 | United Kingdom . | |

OTHER PUBLICATIONS

Dalin et al., The Development of Electrical Conducting Transparent Coatings for Acrylic Plastic Sheet, Balco Research Laboratories, U.S. Wright Air Development Center, Dec., 1954.
Raccenneli et al., Electrical Conductivity of Heat-Treated $SnO_2$ Films, 59, Journ. of the Am. Ceramic Society 425 (1976).
Chem. Abstracts, vol. 98, No. (1983), Transparent Electrically Conductive Films, Nakatani et al., Sep. 9, 1982.
Smith et al., Effects of Heat-Treatment on Indium-Tin Oxide Films, 128, Journ. of Electrochem. Soc. 2388 (1976).
Smith et al., Reactive Mangetron Deposition of Transparent Conductive Films, 72 Thin Solid Films 469 (1980).
Gillery, Large-Scale Sputtering of Indium-Tin Oxide, 15, J. Vac. Sci. Technol. 306 (Mar./Apr., 1978).

Primary Examiner—Arthur Kellogg
Attorney, Agent, or Firm—Price, Heneveld, Cooper, DeWitt & Litton

[57] ABSTRACT

The specification discloses a method for producing a curved glass member having a transparent, electroconductive coating by first coating the glass flat with indium-tin oxide, followed by coating that film with a layer of carbonaceous material and covering that layer with a mating piece of glass while the two pieces of glass are bent in a bending oven.

18 Claims, 16 Drawing Figures

CONDUCTIVE COATING TREATMENT OF GLASS SHEET BENDING PROCESS

BACKGROUND OF THE INVENTION

The ultimate object of the present invention is to produce or make possible the production of a curved glass member having a transparent, electroconductive coating. The invention is particularly adapted to producing such a member for use in heating applications at low voltages relative to prior art. Such glass might be used for CRT screens which you can input by touching, architectural glass (such coatings are infrared reflective), curved, heated mirrors, and heated windows.

One possible application for such a product is automotive windshields. By applying a current to such windshields, accumulated frost, ice or fog can be removed by heating. It has been found that one should be able to generate 0.6 watts per square inch within a windshield of typical shape, with a space of 25″ between the electrical bus bars, in order to clear rime ice 0.1″ thick in about five minutes. Using a 60 volt auxiliary power source, which systems are readily available for use in automobiles, this means that the sheet resistivity of any electroconductive coating on the glass must only be about 10 ohms per square.

Further, federal light transmissibility standard (FMVSS No. 205) requires a 70% minimum visible light transmission at an angle of 90 degrees to the glass surface. Further, the electroconductive coating used, in order to be suitable in appearance, must be very thin, uniform, low in absorption, and low in reflection. These constraints make it particularly difficult to achieve such low resistivity. Assuming a coating with a range of index of refraction of 1.6 to 2.1, as is the case with indium-tin oxide coatings, a nominal full wave coating would have a physical thickness of approximately 3,400 to 2,600 angstroms (i.e., the median wavelength for visible light, 5,500 A, divided by the index of refraction).

Prior to my work, there were no known commercially viable techniques available for providing satisfactory curved glass uniformly coated with such a thin film having such a low resistivity. Of course it is known to put transparent conductive coatings on aircraft windows, display cases and the like. Generally, however, flat glass is used in such applications. Also, high voltage power sources are available in such environments so that a high resistance in the film coating can be tolerated.

A common technique for preparing aircraft windows with electrically conductive coatings is to coat the hot surface of the glass with a tin oxide deposited pyrolytically. U.S. Pat. No. 2,954,454 discloses such a method for creating a coated, bent glass windshield. The problem with such a system is that in order to achieve coatings which make it possible to deliver 0.6 watts per square inch at low voltages, i.e., about 60 volts, one must provide a relatively thick film of between 5,000 and 10,000 angstroms. This results in a windshield or curved glass article which yields a "rainbow" of reflected color when exposed to light. This is partially due to the thickness of the coating, partially to the high index of refraction of tin oxide, and partially to the inherent nonuniform thickness of pyrolytically deposited tin oxide. Also it is suspected that such a process will yield a coating which will craze when the glass is bent, at least if produced on an economical commercial basis and using conventional bending procedures.

Indium-tin oxide has heretofore been sputter coated onto flat glass for use in liquid crystal display electrodes. However, when processed in accordance with conventional procedures, such indium-tin oxide, sputter coated flat glass cannot be bent on a viable production basis without crazing the indium-tin oxide coating. Such crazing of course interrupts the conduction of electricity and leads to serious imperfections in the heating pattern in the product.

United Kingdom Pat. No. 1,446,849, published Aug. 18, 1976, discloses the sputter coating of an already curved sheet of glass. It is believed that such a process would be slow, and uniformity is believed to be a serious problem. It is not believed that such a process would be acceptable in commercial production.

As a result of such drawbacks, it is believed that prior artisans have not heretofore commercially produced electrically conductive curved parts for low voltage by glass coating processes, though a concerted effort is now being made to introduce a heated windshield coated curved with zinc oxide and silver layers. Further, even alternatives other than coating the glass, such as embedded wires or embedded conductively coated plastic films, have not proven commercially acceptable for heating applications where visibility is primary.

I have heretofore found that a key to making an indium-tin oxide coated substrate bendable is to provide for a degree of oxygen substoichiometry in the oxide coating at the time of bend. The extent of substoichiometry must be sufficient to avoid crazing during bending, but not so great as to cause the final product to have less than 70% light transmission or be hazy. This method is disclosed and claimed in my U.S. Pat. No. 4,490,227.

In the foregoing patent, I disclose two specific ways to achieve a degree of substoichiometry at the moment of bend. The first involves initially coating the substrate to a low initial light transmittance ($T_o$), i.e., between about 10 and about 40%. This is sufficiently low to insure a degree of substoichiometry even though the film is subsequently fired at atmosphere. The bending is also conducted in atmosphere.

The second method disclosed involves coating the substrate normally, i.e., to an initial light transmittance which may be as high as about 75%, followed by bending the coated glass in a reducing environment.

Both of these techniques for achieving substoichiometry at the moment of bend are acceptable commercial procedures. However, experience in practicing these previously disclosed techniques has taught that a degree of care has to be taken to avoid faster bends, i.e., bends at higher temperatures, deeper bends and thicker indium-tin oxide films.

SUMMARY OF THE INVENTION

In the present invention, I have found that I can increase processing latitude and make a less expensive product by achieving substoichiometry at the moment of bend by applying a reducing layer of carbonaceous material to an indium-tin oxide coating on a flat glass substrate. This substrate can then be bent under normal bending conditions without causing crazing of the indium-tin oxide film. The presence of the reducing layer of carbonaceous material insures the degree of oxygen substoichiometry at the moment of bend such that crazing the indium-tin oxide layer does not occur.

The present invention lends itself exceptionally well to commercial use in that one does not have to be as careful about the bending temperature, deepness of bend or thickness of the indium-tin oxide coating. Further, one can avoid the so-called "gas forming" step or "reduction cure" which is used in one of the two processes disclosed in my prior '227 patent. Similarly, it is unnecessary to bend the coated glass in a reducing environment as disclosed in the other of the two processes described in the '227 patent.

DESCRIPTION OF THE PREFERRED EMBODIMENT

Figure 1:
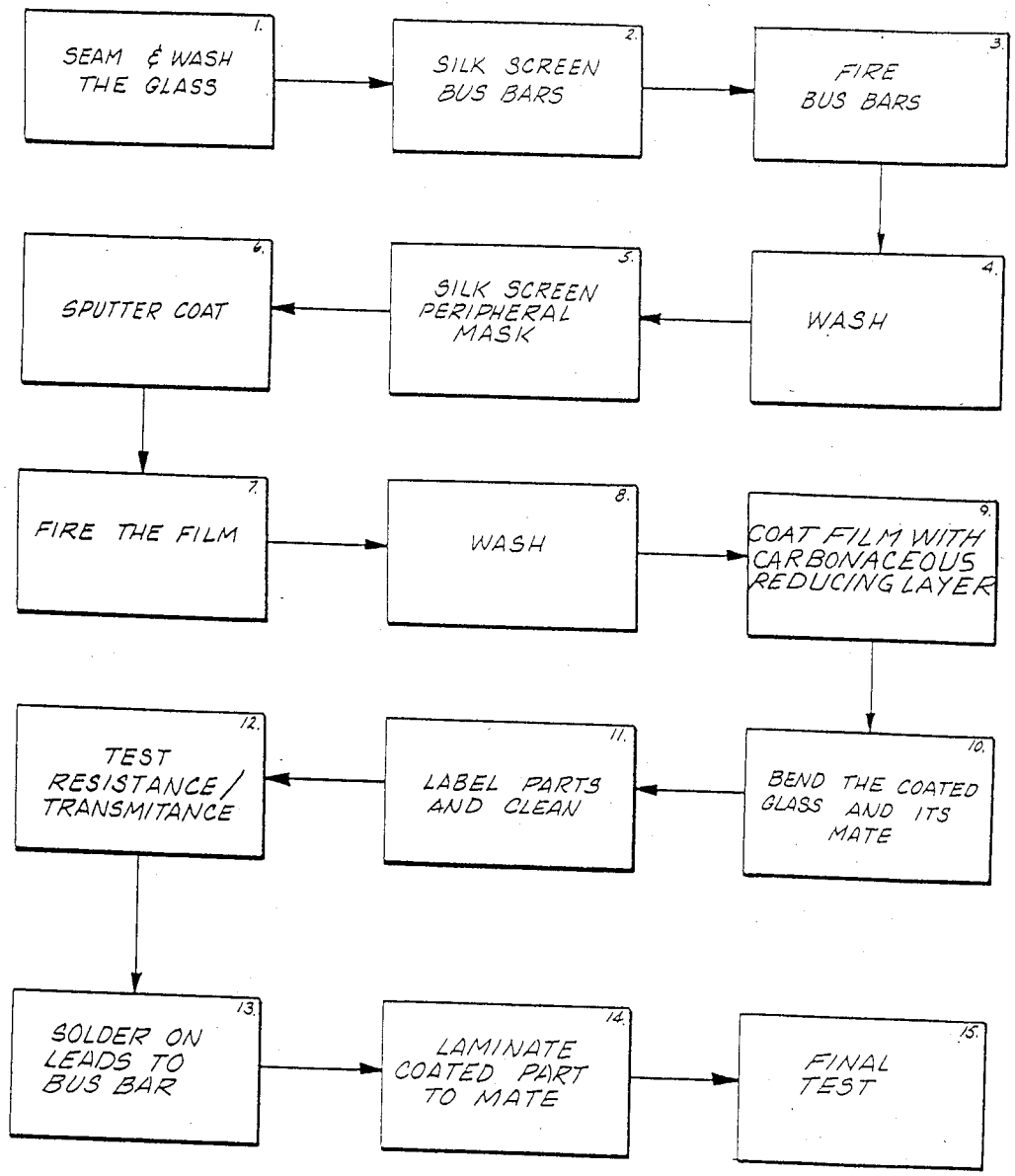
FIG. 1 is a process flow sheet of a preferred embodiment process in accordance with the present invention.

In the preferred embodiment, a flat glass substrate is seamed and washed (step 1, FIG. 1), silk screened with bus bars (step 2), fired in order to harden the bus bars (step 3), washed (step 4), silk screened to provide a peripheral mask (step 5), coated with indium-tin oxide in a magnetron sputterer (step 6), fired to remove the peripheral mask (step 7), washed (step 8), coated with a layer of carbonaceous material (step 9), covered with a glass mate and bent (step 10), labeled and cleaned (step 11), the coated glass tested for resistance and transmittance (step 12), leads soldered to the bus bars (step 13), the coated glass and its mate laminated (step 14) and the laminated windshield subjected to a final test (step 15). All of these steps except the coating of the indium-tin oxide film with a layer of carbonaceous material are conducted in accordance with conventional techniques known to those skilled in the art. An acceptable part is obtained without reduction curing and without bending the coated part in a reducing environment.

Examples of carbonaceous material which can be used as the reducing layer include powdered activated charcoal, powdered charcoal (not activated) and carbon black. Carbon black is particularly effective. One such material is known as "Thermax Ultrapure TM", available from R. T. VanderBilt Company, Inc. of Norwalk, Conn. It is 99.6% carbon, has a mean particle diameter of 270 nanometers and a particle diameter range of from 80 to 500 nanometers. Its nitrogen surface area is 8.5 square meters per gram.

In some of the experimental work reported herein, the carbonaceous material was applied by dusting powdered activated charcoal onto the indium-tin oxide coating. However, it is preferable to prepare and apply a carbonaceous paint. This renders it easier to apply the material. It goes on smoothly and dries in a few seconds.

Preferably, the paint comprises the carbonaceous material, most preferably carbon black, dispersed in a film forming material, e.g. a resinous vehicle such an alkyd resin. Possible alternatives to alkyd resins include ethylcellulose, polyvinyl acetate and polyvinyl buterate resins.

The film former must be a good vehicle for dispersing the carbon black and keeping it in suspension. It must also burn off at temperatures at which the glass is bent.

Volatile solvents are also used to make it easier to apply the paint. Yet, the volatile solvents readily evaporate from the painted surface. A preferred carbon black paint formulation is as follows:

25 grams of carbon black
100 milliliters of alkyd resin solution (45% solids)
100 milliliters toluene
50 milliliters methylethylketone The most preferred alkyd resin is a methyl methacrylate copolymer. It is itself dissolved in solvents such as toluene and methylethylketone to a solids level of around 45%. At that concentration, it has a viscosity of 6,000 to 10,000 cps. Its glass transition temperature $T_g$ is about 50 degrees C. and when dried, has a Tukon hardness of 11-12. One such material commercially available is Acryloid B485 TM available from Rhom and Haas.

The foregoing paint is applied by brushing, or spraying. It is applied to a density of about 0.6 grams per square foot, plus or minus about 30%. Another way to measure the density is to determine the extent to which it absorbs light. A layer of the above described carbon black paint applied to a proper thickness on a piece of clear glass leaves the coated glass with a light transmission of only 20% with reference to light striking the coated glass at a 90 degree angle.

The quantity of carbonaceous material is not overly critical. However, if insufficient carbonaceous material is used, it fails to prevent crazing. If too much is used, the film becomes excessively substoichiometric, and not sufficiently light transmissive. Also, resistance in the final product actually starts coming back up.

Artisans may find that the necessary amount will vary depending on the specific parameters used in other steps, and especially the application of the indium-tin oxide layer. Even so, those skilled in the art will be able to determine the desired carbonaceous material density empirically for any given set of process variations.

Figure 6:
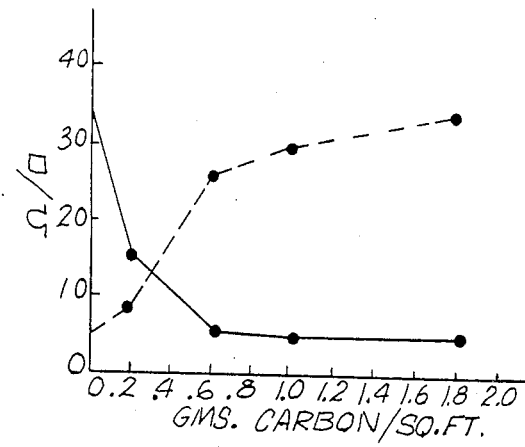
FIG. 6 is a graph showing the degree of coverage of the carbonaceous material charted on the X axis, ohms per square charted on the left hand vertical axis and percent absorption charted on the right hand vertical axis.
Figure 7:
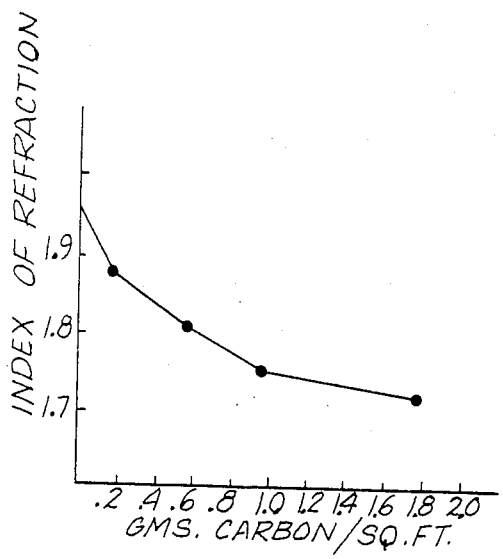
FIG. 7 is a graph showing coverage of carbonaceous material and the X axis versus index of refraction on the Y axis.

The experiments reported in FIGS. 6 and 7 illustrate that about 0.6 grams per square foot, one minimizes the resistivity of the end product indium-tin oxide layer, i.e., to about 5 ohms per square, while maintaining an acceptable layer of light absorption in the final product, i.e., about 6% (FIG. 6). FIG. 6 shows that at 0.6 grams per square foot, an index of refraction of about 1.8 is achieved. This is also acceptable.

The user has broad latitude in particle size of the carbonaceous material. I have successfully used powdered activated charcoal at about 8 mil diameter, with a range of about 3 to 8 mils. Particles larger than about 20 mils are undesirable in that they create spots on the ITO film. At the other extreme, the very fine carbon black particles worked very well. These had a mean diameter of 270 nanometers with a range from 80 to 500 nanometers.

Now turning to the remaining steps of the process, step 1 (FIG. 1) of the process involves seaming and washing the long, cut part. A slightly shorter part is provided as the mate for the longer part and is similarly seamed and washed.

Step 2 involves silk screening electrically conductive bus bars along the top and bottom edges of the long flat piece of seamed glass. This is followed by the conventional step of firing the bus bars in a conventional firing oven (step 3). The part is again washed (step 4) and is ready for step 5 wherein a peripheral zone mask is silk screened onto the part. This is a conventional paint mask, and is intended to prevent the peripheral edges of the glass from becoming coated with a conductive film. This prevents the conductive element from being accidentally grounded onto any contiguous conductive material.

Step 6 involves sputter coating the unheated long glass part to the desired thickness in a partial oxygen atmosphere to a desired initial light transmittance $T_o$. Planar magnetron sputtering is a well-known coating method. The subject is discussed in prior publications such as "Planar Magnetron Cathodes-Past, Present, and Future", Theodore Van Vorous, published by Vac-Tec Systems, Inc., Boulder, Colo.; U.S. Pat. No. 4,046,659 issued Sept. 6, 1977 to Cormia et al.; U.S. Pat. No. 4,022,947 issued to Grubb et al. on May 10, 1977; and Canadian Pat. No. 566,773 issued to Preston on Dec. 2, 1958.

Basically, in typical cathodic sputtering processes, a high negative potential is applied to a cathode assembly which is comprised of the metal(s) sought to be deposited on a substrate, typically glass. The substrate is located in the vicinity of and substantially parallel to the cathode assembly in a vacuum chamber with a low pressure (about $5 \times 10^{-3}$ torr) atmosphere of oxygen and inert gas such as neon, argon, krypton or xenon. The high potential and reduced pressure cause a glow discharge between the cathode and the anode. Under such conditions, the gas is energized and the gaseous ions strike the cathode causing metal ions to be ejected from the cathode and deposited on the surface of the substrate. This process is enhanced where a magnetic field is present which magnetically confines the glow discharge plasma, i.e., a planar magnetron is employed.

Figure 2:
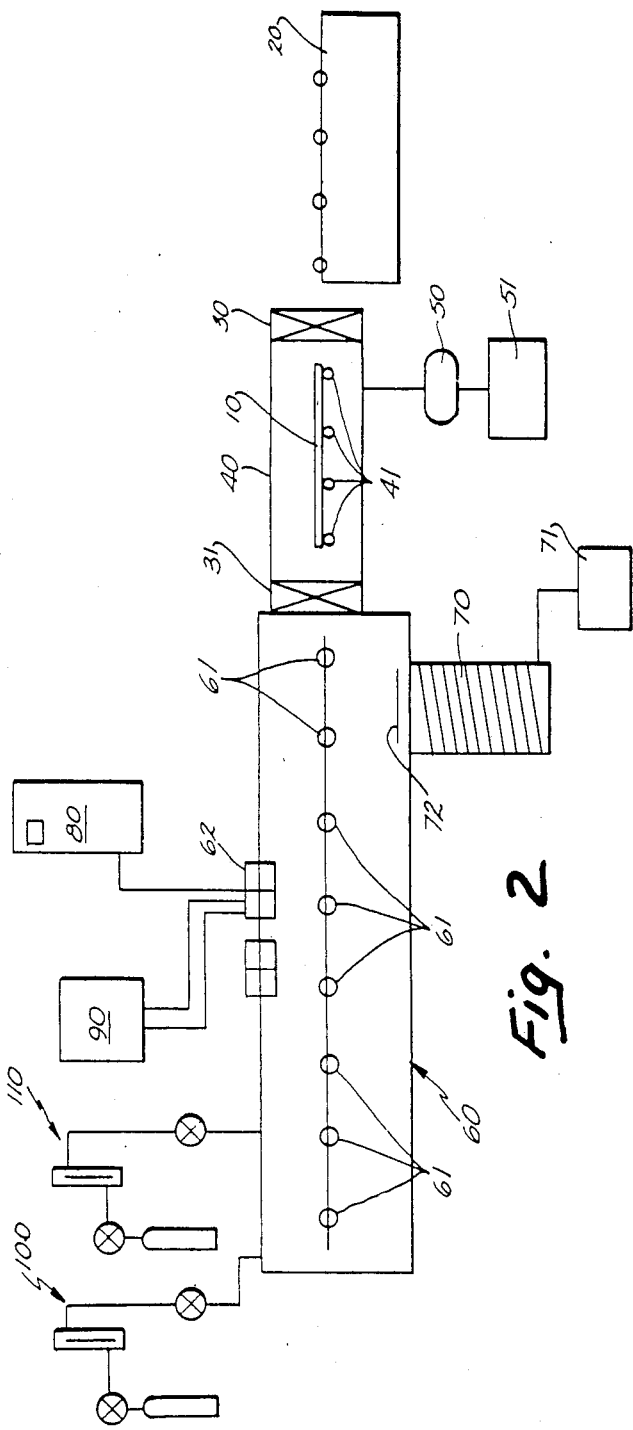
FIG. 2 is a schematic presentation of a planar magnetron sputter coating apparatus of a type which can be used in the present invention.

FIG. 2 shows schematically a typical planar magnetron sputtering apparatus of the type which can be used in practicing the present invention. The part to be coated is placed on a tray 10, located initially on feed table 20, and is passed through an opened gate valve 30 into a load lock 40 having a second gate valve 31 at its other end. A vacuum booster 50 and backing pump 51 are used to evacuate load lock 40 with both gate valves 30 and 31 closed. When the desired vacuum is achieved, load lock 31 is opened and the tray 10 carrying the part to be coated is transported into the evacuated sputtering chamber 60, from motor driven rollers 41 onto motor driven rollers 61.

Vacuum is maintained within sputtering chamber 60 at all times during operation by means of diffusion pump 70 and backing pump 71. A throttle 72 is typically used to help control the vacuum. Tray 10 and the part it carries are passed back and forth on motorized rollers 61 beneath the sputtering target or cathode assembly 62 for as many times as is necessary to coat the part to a desired thickness.

Power to the cathode or target 62 is provided by power supply 80. Target 62 is cooled through a regenerative water cooling system 90. Argon and oxygen are supplied to sputtering chamber 60 by assemblies 100 and 110 respectively.

The composition of the indium-tin cathode 62 is conventional. A tin level of from 1 to 25% is typical, with 9% or 10% optimum. I use a 10% tin, 90% indium target.

It is well-known that the degree of light transmission of the coating, after the sputtering process is complete, is a function of the extent to which the metal has been oxidized as it coats the glass substrate surface. This degree of oxidation is in turn controlled by the relative amount of oxidizer and reaction activating influences (such as substrate biasing, e.g., positive, negative, R.F.) available in the vacuum chamber.

To produce acceptable parts with respect to heating uniformity and appearance, it is also important that the indium-tin oxide film be relatively uniform in thickness across the surface of the parts. Preferably, the thickness should not vary more than about ±7.5%. Such uniformity can be achieved using conventional sputtering techniques, particularly in view of the fact that the present invention contemplates sputter coating a flat part, rather than a curved one.

In the present invention, the initial light transmittance $T_o$ is not particularly critical. Conventionally, the level of oxygen in the planar magnetron sputter is controlled so that $T_o$ of the indium-tin oxide layer is typically around 60 to 70%. This is acceptable for purposes of the present invention.

Indeed, the present invention allows great latitude in $T_o$. I have found that satisfactory product can be made using $T_o$ of anywhere from 1 to 75%. Above about 75%, sputtering efficiency drops off. One tends to get thinner films at 75% or greater $T_o$, thus making it more difficult to obtain lower sheet resistance in the final product. This has no impact per se on the present invention, but there is no advantage in terms of the present invention to employ a $T_o$ above 75%. Hence, there is no reason to accept the lower sputtering efficiency one would obtain at such $T_o$ levels.

For purposes of clarity of the final product, the coating should be as thin as possible while still sufficiently thick to achieve low sheet resistance. Maximum transmission is achieved when the optical film thickness is an integral multiple of one-half of the nominal wavelength of visible light. Variations at other than integral multiples of half wave films will tend to reduce transmission and change the reflected color. Going to a 1.5 wavelength coating, one can achieve the desired film conductivity more easily since, for a given bulk resistivity, a thicker film will be more conductive than a thinner film. However, one undoubtedly sacrifices some light transmission in the final product. I have produced two wave coatings, which can be bent without crazing and believe that even thicker coatings, e.g., three wave, could be produced without crazing. Going to a half wavelength coating affords some improvement in transmission, but results in a more resistive film because it is thinner (assuming everything else is constant). This makes it more difficult to achieve the ultimate desired power density. Hence a full wave coating has been found quite desirable in the present invention.

As is known to those skilled in the art, the part is passed back and forth beneath the sputtering target until the desired film thickness has been achieved. The number of passes to yield a desired film thickness will of course vary from specific apparatus to specific apparatus, and in accordance with other variations in process parameters.

As will be appreciated by those skilled in the art, the various settings for argon pressure, oxygen pressure, power density to the cathode sputtering target, and other such settings may vary from machine to machine and from procedure to procedure used in order to achieve the desired $T_o$. Of course, it is appreciated by those skilled in the art that the primary factor to be controlled is the quantity of oxygen present. Further, it is perhaps significant to other operational parameters that the object of this invention is achieved primarily as a function of $T_o$, regardless of other process variations such as power density to the cathode or anode, argon pressure, or the like. Naturally, variation of these factors may have other process ramifications.

Other problems, unrelated to the essential object of the present invention may show up by varying these factors. I typically deposit the coating without auxiliary substrate heating (the sputtering process itself may warp the glass somewhat). Others may wish to use such auxiliary heat for various reasons. Such heating is one example of a reaction activating influence which will modify the transmission and absorption of the as-deposited film.

Power density to the cathode or anode can be varied as desired by the operator. Some may wish to use various power densities in order to improve the rate of production.

It should be noted that the $T_o$ selected by the operator will have an impact on the subsequent firing step, step 7 (FIG. 1). The firing step is especially important when the indium-tin oxide coating has been applied to a low $T_o$. If a higher $T_o$ is used, e.g. in excess of about 40%, it is not essential for purposes of final light transmissibility of the product to fire. Of course, since firing is necessary to burn off the silk screened peripheral paint mask, an alternative type of mask has to be used if the firing step is eliminated. For example, a metal mask might be clamped or otherwise secured in place for removal later prior to bend. Of course, one advantage to firing is that it helps toughen the indium-tin oxide coating, making it easier to ship the product.

The firing step (step 7) is conducted at approximately 540 degrees C. (for soda lime glass). This oxides the indium-tin oxide film to some extent and it also oxides the peripheral silk screened paint mask. The firing is done in the presence of an oxidizing atmosphere and takes about 3-6 minutes above 500 degrees C. For temperatures less than 500 degrees C., longer times are needed.

In step 8, the oxidized paint mask is removed by washing. The indium-tin oxide coated glass is then ready for step 9, the coating with the carbonaceous layer. This coating is applied as described above. The glass is then ready for step 10, bending.

Figure 3:
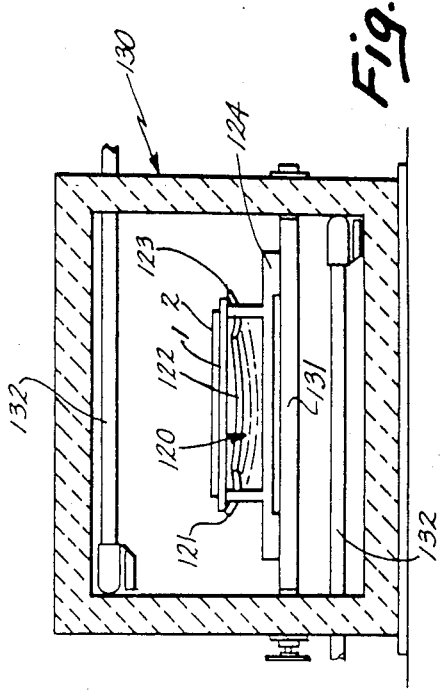
FIG. 3 shows schematically a glass bending frame and oven.

As is conventional in the bending process, the two pieces which are to be later assembled into a single part are bent together. The longer piece is typically placed on the bottom. The shorter piece is placed on top. The two are placed in a bending fixture 120 (FIG. 3). Such fixtures are conventional and generally comprise several hinged segments, 121, 122, and 123 as shown, which in turn are hingedly mounted at some point to a base support 124. The particular shape of the hinged segments will vary depending on the final shape desired for the part. The longer flat piece 1 is placed in the fixture such that it extends between the ends thereof as generally shown in solid lines in FIG. 3, with the shorter piece 2 on top. The entire fixture 120 and parts 1 and 2 are then passed on a conveyor 131 into oven 130. Heat is supplied by heating elements 132 as is conventional. The glass is heated in the oven to a temperature just sufficiently near its softening point to cause it to sag down into the hinged segments 121, 122, and 123 of the bending fixture until it comes to rest against the edges of hinged segments 121, 122 and 123. The sagged or bent condition for the parts and the hinged segments 121, 122, and 123 is indicated in phantom lines in FIG. 3.

This procedure is entirely conventional and can be carried on in a conventional way without crazing the indium-tin oxide coating.

It is necessary that the carbonaceous covered indium-tin oxide film be covered with the mating glass part during bending. This is typically done anyway. The indium-tin oxide film should be located between the lights. Failure to do so will lead to crazing.

The bending is conducted at normal bending temperatures. In the preferred embodiment procedures described in my U.S. Pat. No. 4,490,227, I cautioned against unusual bending procedures. Using the present invention, the operator can be less concerned about bending temperatures and the rate of bend. When the present invention is followed, I have found that the bending temperature can vary between 1100 and 1180 degrees F. without excessive crazing. This may be particularly important in a commercial setting, where it may be more difficult to maintain narrower temperature ranges.

One problem encountered in the present invention is the leakage of oxygen at the edges of the mating sheets of glass. After they are bent together, as the temperature drops, there appears to be excessive oxidation of the indium-tin oxide film at the edges of the indium-tin oxide coated sheet. Resistance at the edges tends to be too high.

This will not be a problem if the product can be designed so that the bus bars are located one inch in from the edge. If that is not possible, another way to solve the problem is to scribe the glass a half inch to an inch from the edge and break off the outside edge after bending has been completed. Another possible solution might be to seal the edges prior to the bending process. This a minor drawback which has to be dealt with in specific overall processing. Nevertheless, it does not detract from the fundamental efficacy of the present invention.

After bending, the two pieces of glass, one coated and one not coated, are separated, labeled for later reassembly, and cleaned (step 11, FIG. 1). The layer of carbonaceous paint can be readily wiped off or dusted off. The paint film forming vehicle has been oxidized during the bending step. An adherence which the paint initially had has been eliminated by decomposition of the resin binder.

After washing, the indium-tin oxide coated part is tested for resistance and transmittance, step 12, FIG. 1. Leads are then soldered onto the previously applied bus bars (step 13). The coated part and its similarly curved mate are then laminated together in a conventional manner using an intermediate polybuterate plastic sheet (step 14). After final testing, the product is ready for shipment to the customer.

EXPERIMENTAL RESULTS

Coating Density

Figure 4:
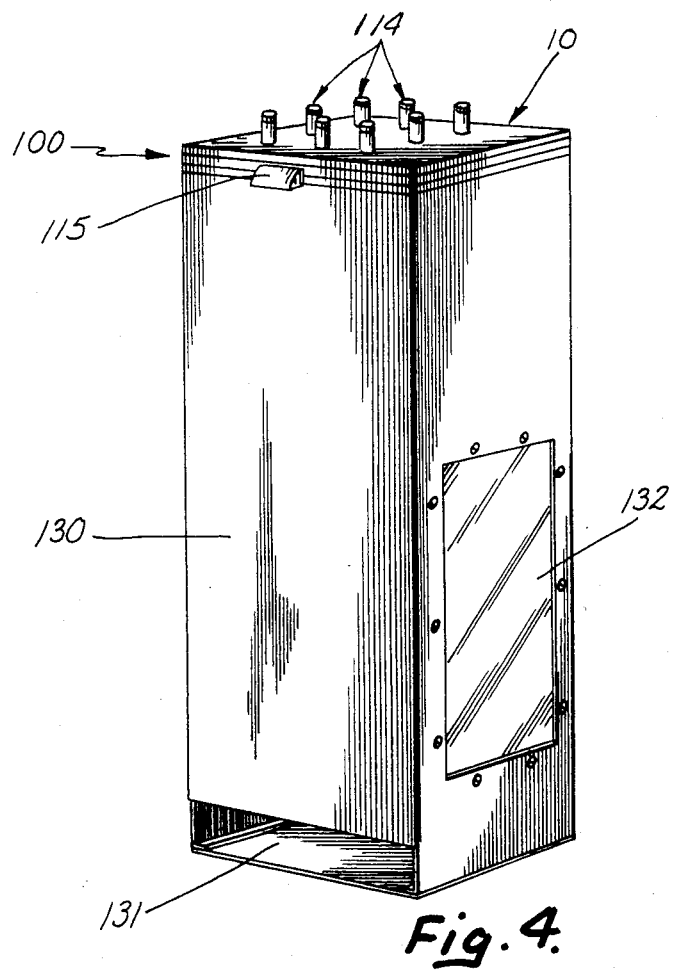
FIG. 4 is a perspective view of experimental apparatus used to dust powdered charcoal onto indium-tin oxide coated glass.
Figure 5:
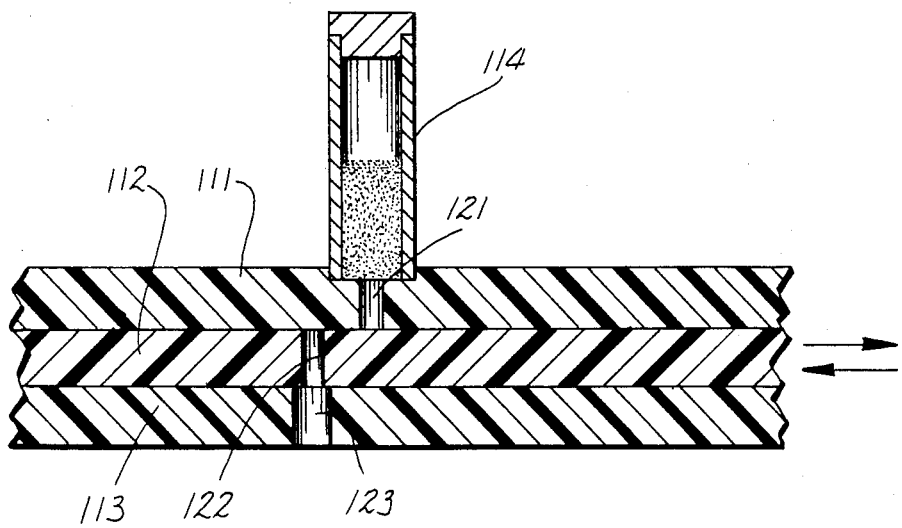
FIG. 5 is a fragmentary sectional view of a portion of the sifter plates at the top of the apparatus of FIG. 4.

Coating density determinations were made by applying powdered charcoal with a charcoal duster 100 operating on the principle of a sifter (FIGS. 4 and 5). The apparatus comprises a dispensing assembly 110 at the top of vertical tunnel 130 (FIG. 4). Dispensing assembly 110 comprises powder tubes 114 which sit atop an assembly of three sifter plates 111, 112 and 113 (FIG. 5). Sifter plates 111, 112 and 113 are adapted to sift powdered charcoal out of tubes 114 and allow it to fall downwardly through a vertical tunnel 130 and onto an indium-tin oxide glass plate located at the bottom of tunnel 130 (FIG. 4). The first sifter plate 111 and the third sifter plate 113 are both fixed. The intermediate sifter plate 112 is movable. Nine 5/64" diameter circular apertures 122 are arrayed about the area of plate 112 on 3" centers. Plate 111 has the same array of the same sized apertures 121 such that the apertures 122 in plate 112 can be aligned with the apertures 121 in plate 111. Nine apertures 123 in plate 113 are similarly arrayed, except that each aperture 123 is slightly larger in diameter than apertures 122 and 121. Further, plates 111 and 113 are offset from one another so that when the apertures 122 in plate 112 are aligned with those (121) in plate 111, they will not be aligned with apertures 123 in plate 113 and vice versa. In this way, a precisely measured amount of powdered charcoal can be metered out of tubes 114 on each double shift of movable plate 112, i.e., first to alignment with the apertures 121 in plate 111 and then to alignment with apertures 123 in plate 113. Shifting plate 112 is provided with a handle 115 to facilitate its manipulation.

Tunnel 130 has an opening 131 at the bottom of one of its walls so that a piece of glass can be inserted at the base of tunnel 130. Tunnel 130 is approximately four feet in height and includes a side window 132 through which the fall of charcoal can be observed.

This apparatus was constructed so that each double shift of plate 112 deposited approximately 0.2 of a gram of powdered charcoal onto the glass plate per square foot. Samples of glass were coated to 0.2, 0.6, 1.0 and 1.8 grams of powdered charcoal per square foot. A control sample of indium-tin oxide coated glass having no layer of powdered charcoal was also tested. The powdered charcoal was of a 50-200 mesh size, thus having a particle size range of from about 3 to about 12 mils. The bulk of the particles were around 8 mils.

Figure 8:
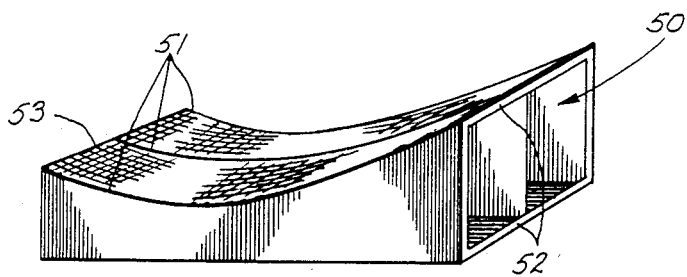
FIG. 8 is a perspective view of an experimental glass bending fixture used in experimental work reported herein.

Each of the samples was covered with a piece of mating glass and bent at approximately 1120 degrees F. on the test bending fixture shown in FIG. 8 and discussed below. The powdered charcoal was then washed away and the parts tested for resistivity, light absorption and index of refraction. In FIGS. 6 and 7, grams of powdered charcoal per square foot are charted on the abscissa. Resistivity is charted on the left hand ordinate of FIG. 6 and the resistivity results are shown by the solid line of FIG. 6. Percent absorption of the final product is charted on the dashed right hand ordinate and is shown by the dashed line in FIG. 6. Index of infraction is shown on the ordinate of FIG. 7.

As expected, the resistivity in the untreated control is far too high, in excess of 30 ohms per square. At about 0.6 grams per square foot, resistivity is brought down to approximately 6 ohms per square. This is acceptable, and very little improvement is seen by adding more charcoal.

At 0.6 grams per square foot, the percent light absorption is still acceptable, i.e. around 6%. This refers to the percent of light absorbed which strikes the glass at a 90 degree angle. Adding more carbonaceous material merely tends to increase the percent absorption without giving a concurrent improvement in resistivity lowering.

FIG. 7 illustrates that the index of refraction does vary in accordance with the amount of charcoal used. At no charcoal, the index is in excess of 1.9. At 0.6 grams per square foot, the index of refraction is approximately 1.8. Lowering the index of refraction cuts down on reflection and increases transmission. It also makes the glass appear more clear and colorless.

Comparative Testing

Figure 9:
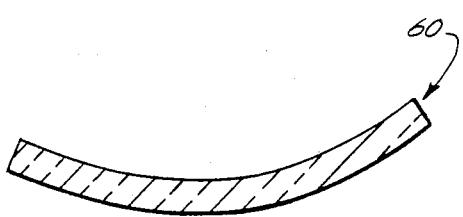
FIG. 9 is a longitudinal cross sectional view of a piece of glass bent on the bending fixture of FIG. 8.

In Examples 1-9, the following parameters were varied: In process step 6, the light transmittance ($T_o$) to which the indium-tin oxide coating was sputtered; in process step 7, firing or eliminating firing of the film; in process step 9, coating the film with a carbonaceous reducing layer or not coating it; in process step 10, the temperature of bend, e.g., 1100 degrees F., 1140 degrees F., 1180 degrees F., or 1220 degrees F. For each example, four different test samples were prepared, and each was bent at one of the different temperatures. The carbonaceous layer was applied in the form of the preferred embodiment paint described above. Ten by fourteen inch samples were tested. The samples were bent on the bending fixture shown in perspective in FIG. 8. Bending test fixture 50 comprises three parallel, curved ribs 51 joined at end members 52 and 53. Each rib has an identical curved configuration such that the ten by fourteen inch piece of glass bent on test fixture 50 has the longitudinal cross section illustrated in FIG. 9, but a wavy lateral cross section (FIG. 10) with a raised central rib 61.

Figure 10:
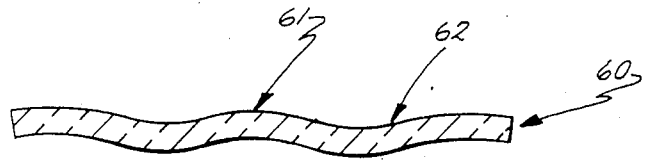
FIG. 10 is a lateral cross sectional view of a piece of glass bent on the bending fixture of FIG. 8.
Figure 11:
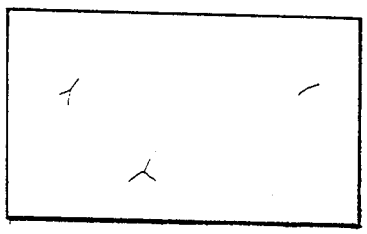
FIG. 11 is a 7× magnification of an indium-tin oxide coating with a craze rating of 2.
Figure 12:
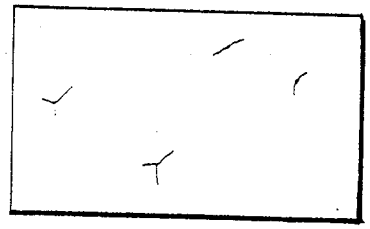
FIG. 12 is a 7× magnification of an indium-tin oxide coating with a craze rating of 4.
Figure 13:
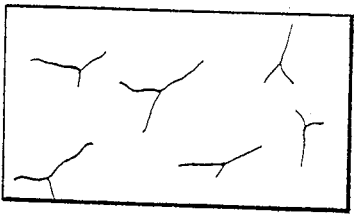
FIG. 13 is a 7× magnification of an indium-tin oxide coating with a craze rating of 6.
Figure 14:
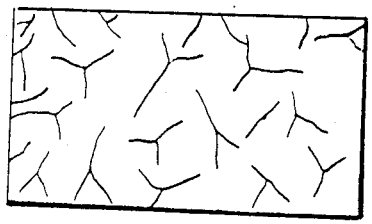
FIG. 14 is a 7× magnification of an indium-tin oxide coating with a craze rating of 8.

In each test, the resistivity of the sample in ohms per square was determined, the light absorption was determined and a degree of craze was established. Resistivity was determined at two points, at the more severe bend defined by rib 61 near the center of glass 60, and away from rib 61 at point 62, still near the longitudinal center of the sample (FIG. 10).

Light absorption was determined based on incident light at 90 degrees to the surface of the glass sample. The amount of light transmitted and the amount of light reflected were added together and subtracted from 100 to determine the amount of light absorbed.

The degree of crazing was established by reference to an arbitrary scale. A set of previously prepared crazed samples were rated with numbers between 0 and 10. Ratings for the samples tested in Examples 1-9 were established by examining them at 7× magnification and comparing each sheet of glass 60 to one of the controls at 7× magnification. The degree of crazing in the controls is illustrated in FIGS. 11-14.

The variations in steps 6, 7 and 9 in preparing the four specimens of Examples 1-9 are shown in Table 1 below.

TABLE 1

| Ex | $T_o$ (step 6) | Fired (step 7) | Coated With Carbon Black Paint (step 9) |
|---|---|---|---|
| 1 | 20 | Yes | No |
| 2 | 5 | Yes | No |
| 3 | 10 | Yes | Yes |
| 4 | 20 | Yes | Yes |
| 5 | 40 | Yes | Yes |
| 6 | 60 | Yes | Yes |
| 7 | 20 | No | Yes |
| 8 | 40 | No | Yes |
| 9 | 60 | No | Yes |

In evaluating the results, it should be kept in mind that the objective of the present invention is to achieve a windshield which will transmit 70% visible light striking the glass surface at an angle of 90 degrees, have a low resistivity and have as little crazing as possible. The resistivity desired is less than 20 and most preferably less than 10 ohms per square. On the arbitrary scale of 0 to 10 which I have established, the degree of crazing should be less than about 4. Crazing in excess of 4 results in an unacceptable product.

Table 2 below presents the results for each of the four samples made in accordance with each of the nine Examples. The Table is arranged with the example number in the left vertical column and the temperature of bend across the top in the next four columns. Each column is divided into three subcolumns for presentation of the resistivity of the sample in ohms per square, as measured at two different points, light absorption and the degree of crazing. Light absorption of less than 15% is acceptable, though it is more preferable that light absorption be below 10%.

is that the parts have not been reduction cured. Hence in each case, the resistivity in ohms per square is rather high, e.g., between 71 and 91. These numbers would be substantially reduced if the reduction curing step called for in alternative embodiment process 1 of my '227 patent were employed.

For purposes of the present invention, it is more significant to note that while the samples of Example 1 showed acceptable crazing levels when bent at 1100 and 1140 degrees F., they showed unacceptable crazing levels when bent at 1180 and 1220 degrees F.

This is in contrast to the four samples each for Examples 2-9, all of which are made in accordance with the present invention. In all of these cases, the crazing levels were acceptable at bending temperatures up to 1180 degrees F. In some of the samples, the crazing levels were acceptable even at 1220 degrees F., see e.g., Examples 2, 3, 7 and 8.

The foregoing comparative samples also illustrate some of the process variations which have to be employed depending on the particular $T_o$ which one elects as a starting point. In Examples 2 and 3, the $T_o$'s were 5 and 10% respectively. In each of those Examples, the sample was fired prior to being coated with carbon black paint. In the case of all four samples, the resistivity and the percentage of light absorbed were acceptable.

In contrast, the samples of Example 7 were initially coated with indium-tin oxide to a $T_o$ of 20%, but not fired. In those samples, absorption ran high, i.e., in excess of 20%, for each of the samples bent at 1100, 1140 and 1180 degrees F. Absorption became acceptable, i.e., 12%, when the sample was bent at 1220 degrees F. due to the inherent firing which took place at that more elevated temperature. Hence if one does elect to begin with a low $T_o$, the firing step (step 7) described above is most preferably used.

Firing was acceptably eliminated in Examples 8 and 9, where the $T_o$'s were 40 and 60% respectively. In those Examples, the degree of light absorption was in all cases acceptable.

Examples 4, 5 and 6 were like Examples 7, 8 and 9 respectively, except that the firing step was used. In all cases, the degree of light absorption was acceptable.

TABLE 2

| | 1100° F. | | | 1140° F. | | | 1180° F. | | | 1220° F. | | |
|---|---|---|---|---|---|---|---|---|---|---|---|---|
| Ex | Ω/□ | A | Craze | Ω/□ | A | Craze | Ω/□ | A | Craze | Ω/□ | A | Craze |
| 1 | 84, 91 | 1.4 | 0 | 89, 88 | 1.4 | 2.2 | 91, 86 | 1.6 | 4.5 | 83, 71 | 1.7 | 5.2 |
| 2 | 14, — | 7.0 | 0 | 17, 18 | 8.0 | 0 | 14, 15 | 7.8 | 1.2 | 14, 14 | 7.4 | 3.5 |
| 3 | 23, 15 | 6.9 | 0 | 17, 15 | 7.8 | .2 | 13, 15 | 7.8 | 1.5 | 17, 14 | 8.0 | 3.2 |
| 4 | 11, 11 | 6.4 | 0 | 11, 11 | 8.0 | .2 | 13, 10 | 9.1 | 2.5 | 11, 10 | 7.6 | 4.2 |
| 5 | 10, 12 | 6.0 | 0 | 13, 10 | 7.4 | 1.5 | 9, 10 | 9.1 | 3.2 | 11, 10 | 7.6 | 5.2 |
| 6 | 12, 19 | 6.6 | 0 | 12, 8 | 12.0 | 2.2 | 10, 10 | 11.4 | 3.0 | 7, 12 | 11.9 | 6.5 |
| 7 | 15, 18 | 23.6 | .2 | 20, 19 | 27.1 | 0 | 20, 20 | 20.8 | 0 | 18, 16 | 12.0 | 1.2 |
| 8 | 16, 17 | 7.6 | 0 | 15, 20 | 8.4 | 1.5 | 15, 12 | 7.5 | 3.2 | 12, 16 | 7.3 | 3.2 |
| 9 | 12, 11 | 4.8 | 0 | 10, 9 | 9.4 | 1.5 | 10, 10 | 11.0 | 3.2 | 8, 8 | 11.2 | 6.5 |

Reviewing the Examples, it can be seen that the four samples of Example 1 are made generally in accordance with the first alternative embodiment process described in my prior U.S. Pat. No. 4,490,227. The one exception Finally, it will be noted that the resistivity in the case of all samples of Examples 2-9 was less than 20 ohms per square, with the exception of one point on one sample, i.e., the point on rib 61 of the Example 3 sample which was bent at 1100 degrees F. In that case, the resistivity was recorded at 23 ohms per square. This can probably be viewed as an acceptable statistical variation.

Figure 15:
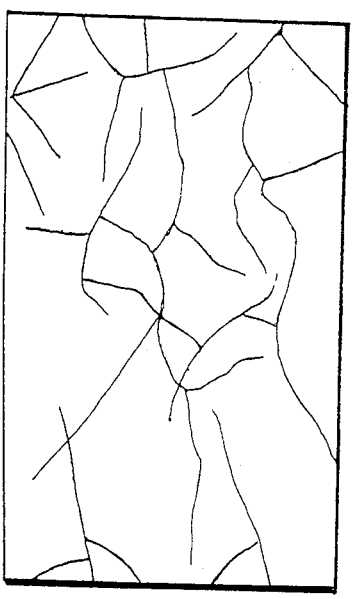
FIG. 15 is a 50× magnified view of an indium-tin oxide coated glass substrate, where the coating was applied to the substrate flat and the composite then bent without using a carbonaceous coating.
Figure 16:
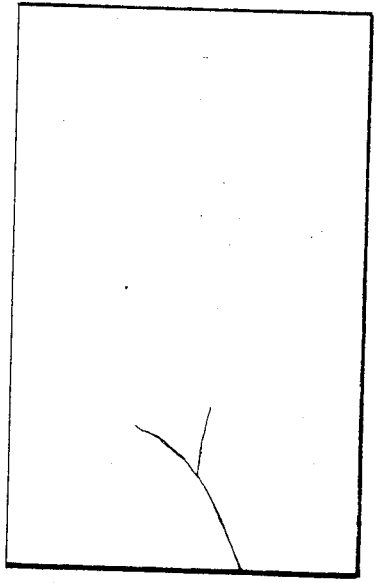
FIG. 16 is the same 50× view as FIG. 4, except of a glass substrate and indium-tin oxide coating for which a layer of carbonaceous material was applied prior to bending.

In one more comparative test, a 50× magnification photograph was made of a piece of glass coated flat with indium-tin oxide in a conventional manner and subsequently bent without using the present invention or the invention covered by my U.S. Pat. No. 4,490,227 (FIG. 15). For comparison purposes, a similar 50× photo was taken of a piece of glass coated flat with indium-tin oxide in a conventional manner, subsequently coated with a layer of powdered charcoal in accordance with the present invention and bent in accordance with the present invention (FIG. 16). A comparison of FIGS. 15 and 16 illustrates the significant improvement in the continuity of the indium-tin oxide coating when the present invention is employed. The film shown in FIG. 15 would have a craze rating of approximately 9, whereas the film shown in FIG. 16 would have a craze rating of about 1.

CONCLUSION

In conclusion, it can be seen that the process of the present invention surprisingly broadens the window of operability of the underlying basic method disclosed and claimed in my prior U.S. Pat. No. 4,490,227. In achieving substoichiometry at the moment of bend by applying a layer of carbonaceous material over the indium-tin oxide film, one greatly increases important process latitude, e.g. in the areas of the initial light transmittance ($T_o$) to which the indium-tin oxide film is applied and the temperature at which the coated glass is bent. Yet just as with the two specific preferred embodiment processes disclosed in my U.S. Pat. No. 4,490,227, I achieve with the present invention a windshield which will meet light transmission standards (70% minimum) and which will have an acceptably low sheet resistivity such that it can be used in conjunction with a readily available 60 volt auxiliary power source. Most importantly, the glass can be coated flat and subsequently bent without causing undue crazing in the indium-tin oxide film.

Another surprising and unexpected advantage of the present invention is that by coating the indium-tin oxide film with a layer of carbonaceous material, one substantially increases the radiation emissivity of the surface of the coated glass. Normal bare glass has an emissivity of about 0.88. When the glass is coated with ITO and fired, emissivity is lowered to 0.3 or 0.4. When one places the mating sheet of glass against the indium-tin oxide coated surface of the first sheet of glass, the difference in emissivity could lead to some problems in bending, for example, (1) slower bend rates (production) and/or (2) optical problems. The carbonaceous layer increases the emissivity of the indium-tin oxide coated surface to levels comparable to that of the uncoated glass. Additionally, the carbon promotes thermal conduction between the plies. Precise use of the carbonaceous layer can restore the heat transfer between the plies to nearly the level that occurs in normal windshield bending, thus minimizing changes to production rate or windshield optical quality in this process.

Of course, it is understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows.

1. A method for forming a curved, electrically conductive glass member comprising:
   coating a flat piece of glass with an indium-tin oxide coating;
   applying a layer of carbonaceous material on top of said indium-tin oxide coating;
   bending said glass member with heat while minimizing exposure of said carbonaceous layer to oxygen, whereby crazing of said indium-tin oxide coating is minimized.

2. The method of claim 1 in which said step of minimizing exposure of said carbonaceous layer to oxygen during bending is conducted by covering said carbonaceous layer with a second sheet of glass and bending said first and second sheets of glass together with heat with said indium-tin oxide and carbonaceous layers sandwiched between said first and second sheets of glass.

3. The method of claim 2 in which said carbonaceous material is applied to a density of approximately 0.6 of a gram per square foot.

4. The method of claim 3 in which said carbonaceous material is selected from the group consisting of powdered activated charcoal, powdered charcoal, powdered graphite and carbon black.

5. The method of claim 4 in which said carbonaceous material is incorporated into a paint and is applied to said indium-tin oxide layer in paint form.

6. The method of claim 4 in which said carbonaceous layer is dusted onto said indium-tin oxide layer.

7. The method of claim 4 in which said indium-tin oxide layer is applied to an initial light transmittance ($T_o$) of greater than about 40, said bending step being conducted without any firing of said indium-tin oxide layer in oxygen between said initial application step and said bending step.

8. The method of claim 4 in which said indium-tin oxide layer is applied on said glass to an initial light transmittance ($T_o$) of less than about 40; said indium-tin oxide layer being fired in an atmosphere containing oxygen prior to said bending step.

9. The method of claim 4 in which said curved, electroconductive glass member is made without using a reduction cure step.

10. The method of claim 3 in which said indium-tin oxide layer is applied to an initial light transmittance ($T_o$) of greater than about 40, said bending step being conducted without any firing of said indium-tin oxide layer in oxygen between said initial application step and said bending step.

11. The method of claim 3 in which said indium-tin oxide layer is applied on said glass to an initial light transmittance ($T_o$) of less than about 40; said indium-tin oxide layer being fired in an atmosphere containing oxygen prior to said bending step.

12. The method of claim 3 in which said curved, electroconductive glass member is made without using a reduction cure step.

13. The method of claim 2 in which said indium-tin oxide layer is applied to an initial light transmittance ($T_o$) of greater than about 40, said bending step being conducted without any firing of said indium-tin oxide layer in oxygen between said initial application step and said bending step.

14. The method of claim 2 in which said indium-tin oxide layer is applied on said glass to an initial light transmittahce ($T_o$) of less than about 40; said indium-tin oxide layer being fired in an atmosphere containing oxygen prior to said bending step.

15. The method of claim 2 in which said curved, electroconductive glass member is made without using a reduction cure step.

16. The method of claim 1 in which said indium-tin oxide layer is applied to an initial light transmittance ($T_o$) of greater than about 40, said bending step being conducted without any firing of said indium-tin oxide layer in oxygen between said initial application step and said bending step.

17. The method of claim 1 in which said indium-tin oxide layer is applied on said glass to an initial light transmittance ($T_o$) of less than about 40; said indium-tin oxide layer being fired in an atmosphere containing oxygen prior to said bending step.

18. The method of claim 1 in which said curved, electroconductive glass member is made without using a reduction cure step.

* * * * *

UNITED STATES PATENT AND TRADEMARK OFFICE
CERTIFICATE OF CORRECTION

PATENT NO. : 4,655,811

DATED : April 7, 1987

INVENTOR(S) : Lowell E. Bitter

It is certified that error appears in the above-identified patent and that said Letters Patent is hereby corrected as shown below:

Column 1, line 48:

"uscd" should be --used--

Column 4, line 28:

"an" should be --as--

Column 8, line 67:

after "This" insert --is--

Column 9, line 8:

"An" should be --Any--

Column 11, Table 1:

In Example 2, last column, "No" should be --Yes--

UNITED STATES PATENT AND TRADEMARK OFFICE
CERTIFICATE OF CORRECTION

PATENT NO. : 4,655,811
DATED : April 7, 1987
INVENTOR(S) : Lowell E. Bitter

It is certified that error appears in the above-identified patent and that said Letters Patent is hereby corrected as shown below:

Column 15, line 3, claim 14:

"transmittahce" should be --transmittance--

Signed and Sealed this

Sixth Day of October, 1987

Attest:

DONALD J. QUIGG

*Attesting Officer*   *Commissioner of Patents and Trademarks*